UNITED STATES PATENT OFFICE.

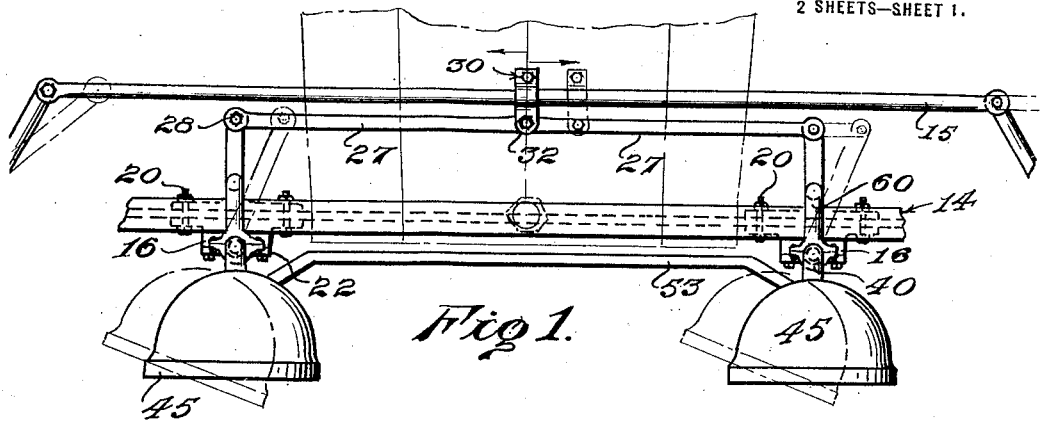
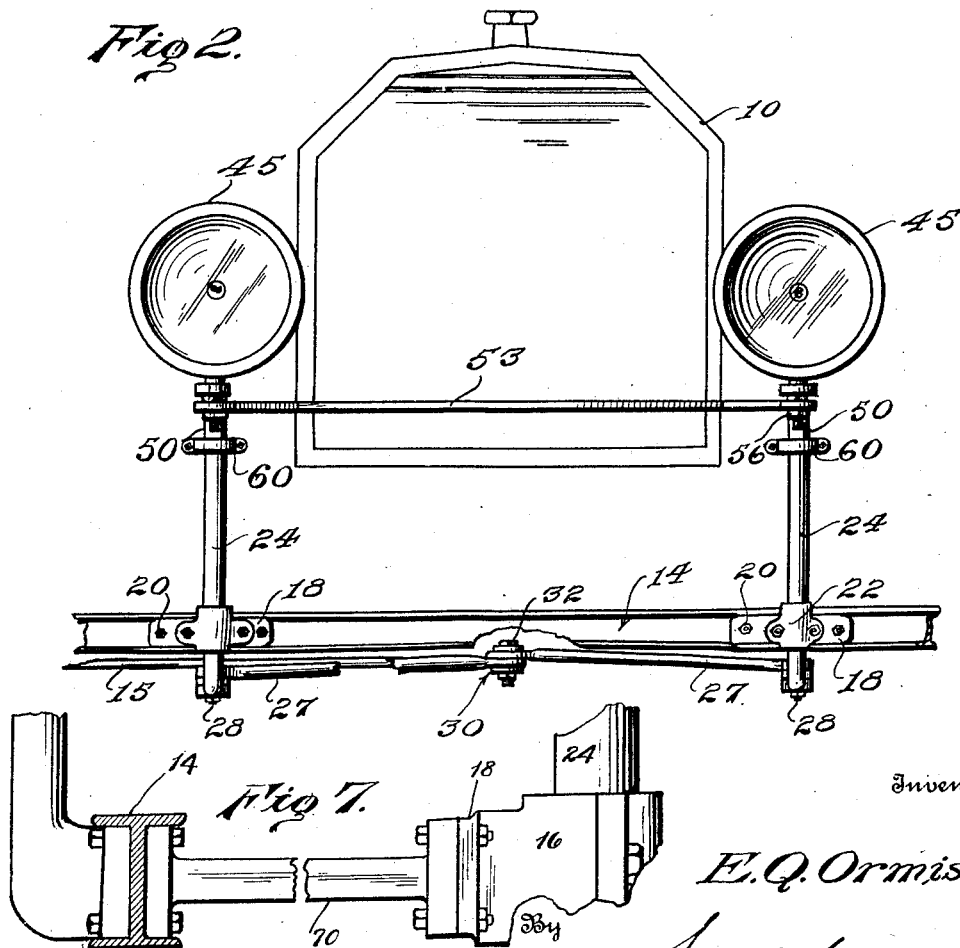

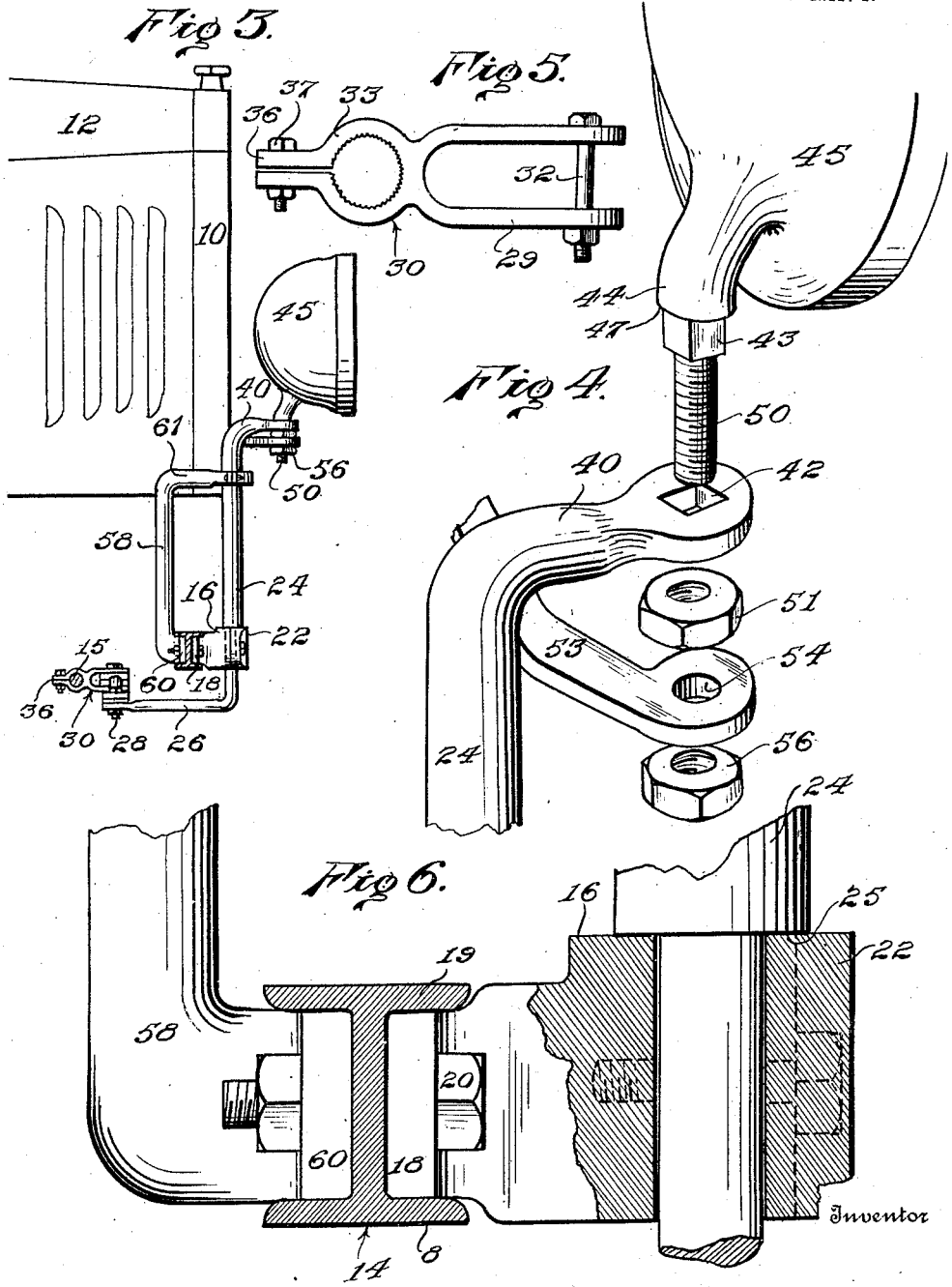

EDWARD QUAY ORMISTON, OF DETROIT, MICHIGAN.

DIRIGIBLE HEADLIGHT.

1,408,627. Specification of Letters Patent. Patented Mar. 7, 1922.

Application filed October 25, 1920. Serial No. 419,192.

*To all whom it may concern:*

Be it known that I, EDWARD QUAY ORMISTON, a citizen of the United States, residing at Detroit, in the county of Wayne and State of Michigan, have invented certain new and useful Improvements in Dirigible Headlights, of which the following is a specification.

This invention relates to improvements in dirigible headlights especially adapted for application to motor vehicles.

An important object of this invention is to provide reliable means whereby the headlights of a motor vehicle may be turned or rotated when the wheels are turned by the steering apparatus so that when the vehicle is making a turn, the headlights will shine in the direction of travel of the front wheels, thereby illuminating the curve or bend in the road rather than shining directly forwardly of the vehicle.

The invention forming the subject matter of this application aims also to provide novel means whereby the headlights and the turning and supporting means of the same may be supported solely by the vehicle axle so that the movement of the body with relation to the front axle as the result of encountering inequalities in the road, will not bend or break the rods which connect the headlights to the steering apparatus. This feature of the invention, in addition to eliminating the possibility of parts of the apparatus becoming strained also prevents the headlights and associated parts from becoming loose and noisy, and also permits the same to readily respond to the operation of the steering apparatus.

A further object of the invention is to provide a pair of dirigible headlights and supporting means for the same which may be readily and conveniently attached to motor vehicles either in the course of manufacture or while the same are in use.

A still further object of the invention is to provide a dirigible headlight which is neat in appearance, desirable in use and cheap to manufacture.

Other objects and advantages of the invention will be apparent during the course of the following description.

In the accompanying drawings, forming a part of this specification, and in which like numerals are employed to designate like parts throughout the same:

Figure 1 is a plan view of the improved dirigible headlights applied.

Figure 2 is an elevation of a pair of the improved headlights applied,

Figure 3 is a side elevation of one of the improved headlights applied,

Figure 4 is a fragmentary perspective view of the supporting and bracing means for the headlights, Figure 5 is a side elevation of a clamp embodied in the invention, Figure 6 is a detail sectional view through the supporting means for the headlight, Figure 7 is a fragmentary elevation of a slightly modified form of attaching member embodied in the invention.

In the drawings, wherein for the purpose of illustration is shown a preferred embodiment of the invention, the numeral 10 designates the radiator of a motor vehicle which as is usual, is provided with an internal combustion engine or other source of power within or beneath a hood 12. The motor vehicle is provided with the usual front axle 14, in the form of an I beam and which has its ends connected by means of spindles to the front wheels. As this particular part of a motor vehicle is old and well known, detailed illustration is believed to be unnecessary. A transversely extending tie rod 15 is arranged rearwardly of the front axle 14 and is connected to the wheel spindles so that when a rotary motion is given the steering wheel the front wheels of the vehicle will be turned in the desired direction.

The invention forming the subject matter of this application comprises in part a pair of vertically arranged bearings 16 having laterally projecting attaching flanges 18 secured between the flanges 8 and 19 of the front axle by means of bolts 20. With reference to Figures 3 and 6, it will be observed that each bearing 16 and the detachable cap 22 of the same rotatably supports an L-shaped arm 24 having its lower portion reduced so as to form an annular shoulder 25 which rests upon the bearing. The lower portion of each arm 24 is extended rearwardly as indicated at 26 and is pivoted to one of a pair of connecting rods 27 by means of pivot elements 28. The connecting rods 27, of which there are two, are extended inwardly and have their adjacent end portions overlapped and confined between the arms 29 of a clamp 30 adapted to be connected to the intermediate portion of the tie rod 15. A bolt 32 is extended through the arms 29 of the clamp and serves to pivotally connect the adjacent ends of the connecting rods 27 to the clamp so that when the clamp is moved transversely of the vehicle a similar movement will be imparted to the connecting rods. The gripping portion 33 of the clamp 30 is in the form of a split loop adapted to be arranged about the tie rod and the ends of the split loop are extended rearwardly to form ears 36 adapted to be connected by means of a bolt 37.

The upper portion of the L-shaped arm 24 is extended forwardly as indicated at 40 and is formed with a squared socket 42 adapted for the reception of the squared portion 43 of the shank 44 of a headlight 45. When the squared portion 43 of the shank 44 is received within the squared socket or opening 42 a shoulder 47 formed upwardly of the squared portion 43, engages the adjacent portion of the arm and limits the downward movement of the shank.

A portion of the shank 44 is screw threaded as indicated at 50 and is adapted to be engaged by a lock nut 51 which serves to confine the squared portion of the shank within the opening 42. As illustrated in Figures 1 and 2, a bracing member in the form of a rod 53 is extended across the front of the radiator and has its end portions curved and formed with apertures 54 which receive the threaded portions 50 of the shank. The rod 53 which serves as a means for bracing the headlight and the supporting means for the same, is held in engagement with the screw threaded portion 50 by means of a lock nut 56. A further function of the rod 53 is to cause the headlights to operate in unison.

As illustrated in Figures 3 and 6, a bracket 58 is provided at its lower end with laterally projecting attaching flanges 60 which are secured to the axle by means of the bolts 20 which are also extended through the laterally projecting flanges 18 of the bearings 16. The upper portions of the brackets are provided with forward extensions 61 which rotatably receive the upper portion of the arms 24.

In applying the improved headlight to a vehicle, the axle of the vehicle is provided with openings for the reception of the bolts 20 and the bearings 16 and the bracket 58 are subsequently connected to opposite sides of the axle. The extensions 61 are, of course, previously connected to the arms 24 and the caps 22 may now be applied to the bearings for properly supporting the arms. The final step of the operation of applying the improved headlights, is to connect the shanks of the same by means of the transversely extending rod 53.

In some motor vehicles, the axle 14 is arranged some distance rearwardly of the plane of the radiator and if the bearing 16 were attached directly to the axle, as illustrated in Figure 6, the arm 24 would extend up rearwardly of the radiator. To overcome this difficulty, which would exist in applying the invention to some machines, I have provided an extension 70 which may be arranged between the axle and the bearing and connected to the same through the medium of bolts. When a pair of the extensions 70 are employed, the length of the extensions 61 and the arms 26 will have to be correspondingly increased.

In the use of the device, the operation of the steering apparatus will direct the light either to the right or to the left, according to the direction taken by the front wheels. In this manner, the curve in a roadway is illuminated rather than the space at one side of the road directly in front of the vehicle.

With reference to Figure 2, it will be observed that the headlights and the supporting means for the same, are supported entirely by the front axle so that any movement of the body of the vehicle with reference to the front axle will not cause the connecting rods 27 to loosen or become strained. In this manner, the headlights and the supporting means for the same are prevented from possibly breaking and becoming noisy as the result of continuous use.

Having thus described the invention, what is claimed as new is:

1. The combination with a vehicle having a front axle and a steering apparatus provided with a transversely extending tie rod, of bearings secured to the front side of the axle, arms rotatably supported by said bearings and having their upper extremities extended forwardly and their lower portions extended rearwardly under the axle, headlights secured to the forwardly extended upper extremities of said arms, brackets secured to the rear side of the axle and having their upper portions extended forwardly over to rotatably receive said arms, connecting rods pivoted to the rearwardly extended lower portions of said arms, and a clamp secured upon and projecting forward from the tie rod and having adjacent ends of the connecting rods pivoted to its forward extremity.

2. The combination with a vehicle having a front axle, and a steering apparatus provided with a transversely extending tie rod, of bearings secured to the front side of the axle, arms rotatably supported by said bearings and having their upper ends extended forwardly, headlights secured to the forwardly extended portions of said arms and held against relative turning movement thereon, brackets secured to and rising from the rear side of said axle and having their upper portions projecting forwardly to rotatably receive said arms, the lower portions of said arms being extended rearwardly under the axle and said brackets, connecting rods pivoted to the rearwardly extended portions of said arms, a pivotal connection between the inner ends of the connecting rods and the tie rod, and a bracing rod extending between and pivotally connected to said headlights.

In testimony whereof I affix my signature.

EDWARD QUAY ORMISTON. [L. S.]